E. P. ELZEY.
TEETER.
APPLICATION FILED OCT. 13, 1917.
1,273,591.
Patented July 23, 1918.
2 SHEETS—SHEET 1.
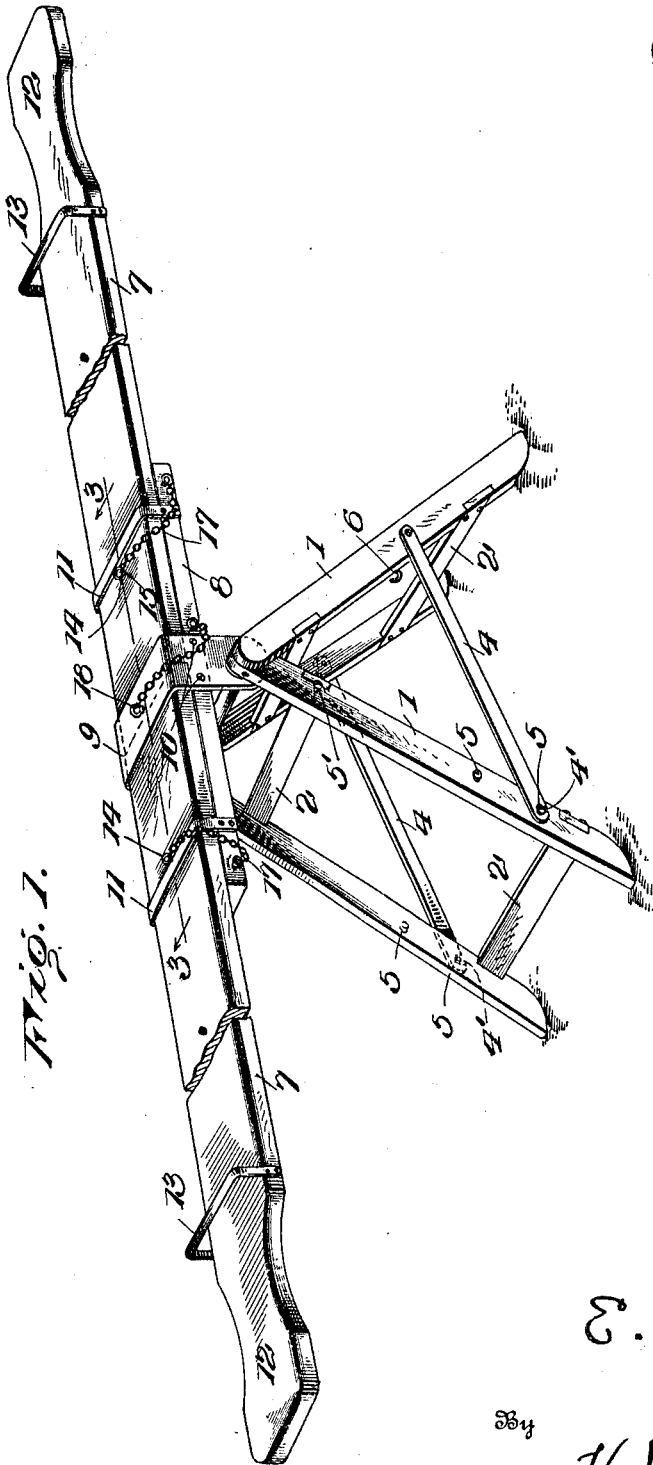
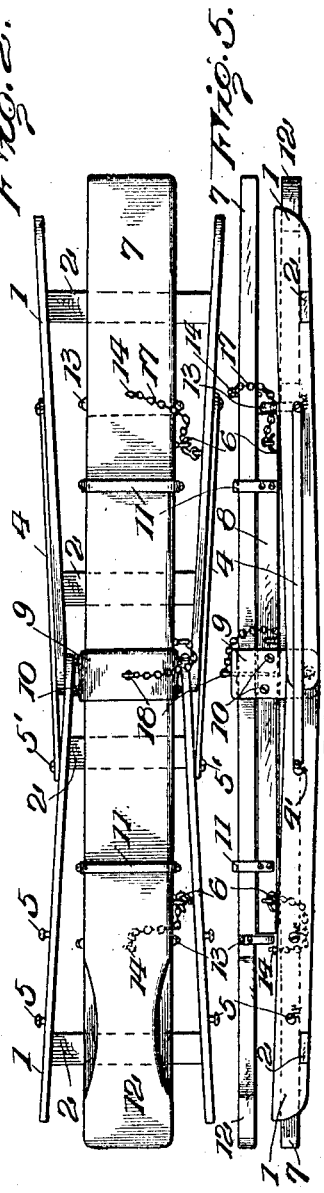
Inventor
E. P. Elzey
By
Hulut Peck  Attorney E. P. ELZEY.
TEETER.
APPLICATION FILED OCT. 13, 1917.
1,273,591.
Patented July 23, 1918.
2 SHEETS—SHEET 2.
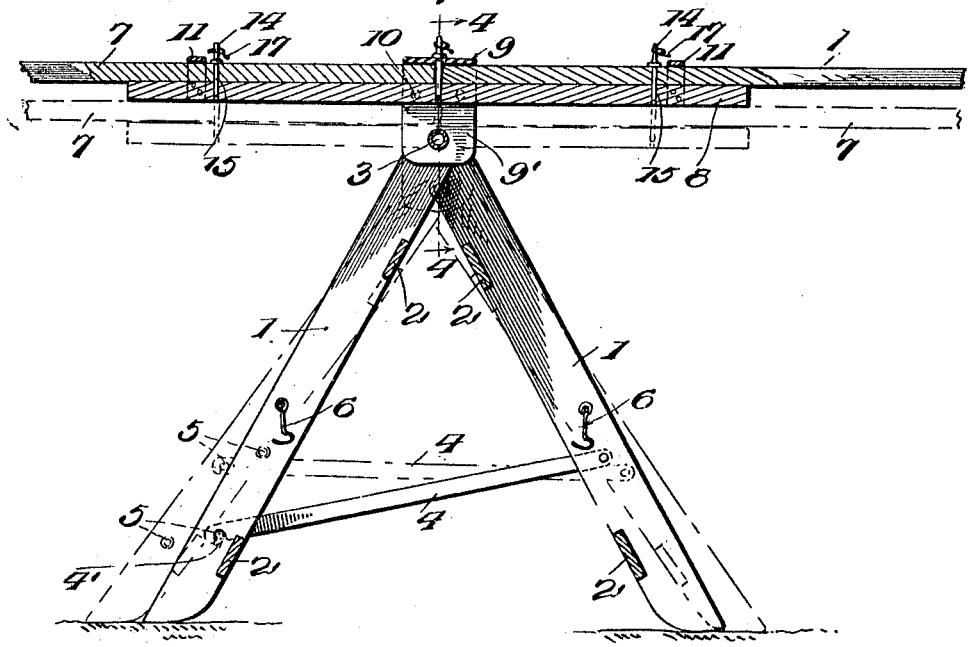
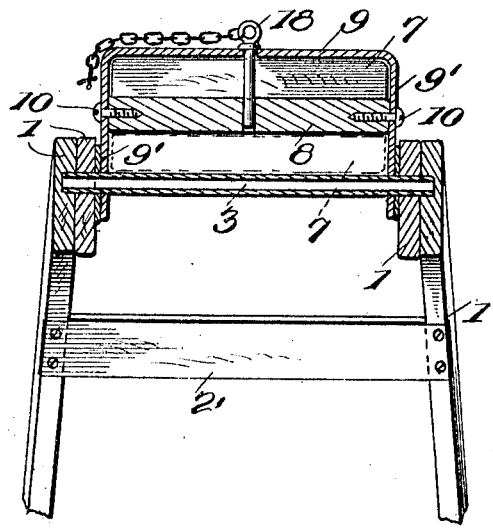
Inventor
E. P. Elzey
By
Hubert Peck, Attorney

UNITED STATES PATENT OFFICE.

EDGAR P. ELZEY, OF PARKERSBURG, WEST VIRGINIA, ASSIGNOR TO EDWIN L. DAVIDSON, OF PARKERSBURG, WEST VIRGINIA.

TEETER.

1,273,591. Specification of Letters Patent. Patented July 23, 1918.

Application filed October 13, 1917. Serial No. 196,421.

*To all whom it may concern:*

Be it known that I, EDGAR P. ELZEY, a citizen of the United States of America, and resident of Parkersburg, county of Wood, and State of West Virginia, have invented certain new and useful Improvements in Teeters, of which the following is a specification.

This invention relates to certain improvements in teeters; and the objects and nature of the invention will be readily understood by those skilled in the art in the light of the following explanation of the accompanying drawings illustrating what I now believe to be the preferred embodiment or mechanical expression of my invention from among other forms, constructions and arrangements within the spirit and scope thereof.

An object of the invention is to so improve children's seesaws or teeters as to increase the durability and strength thereof and render the same collapsible into a small compass for packing, transportation and storage.

A further object of the invention is to produce a teeter embodying a foldable or collapsible horse or support and a beam or seesaw fulcrumed or balanced on the horse and composed of sections detachably united and arranged to be collapsed or knocked down and secured together and to the horse for packing and storage within a comparatively small space.

A further object of the invention is to produce a teeter embodying a seesaw beam capable of being reduced in length to occupy a comparatively small space for convenience in carrying from place to place for storage and packing.

The invention consists in certain novel features in construction and in combinations and arrangements as more fully and particularly set forth and specified hereinafter.

In the accompanying drawings:

Figure 1, is a perspective of the teeter of my invention with the parts assembled in operative position.

Fig. 2, is a top plan view of the teeter collapsed or folded for transportation or storage.

Fig. 3, is a section on the line 3—3, Fig. 1.

Fig. 4, is a section on the line 4—4, Fig. 3.

Fig. 5, is an edge elevation of the teeter when collapsed or folded for transportation or storage.

The particular example illustrated consists of a horse or supporting stand, and a seesaw beam mounted thereon or fulcrumed thereto. The horse comprises a pair of approximately similar downwardly-diverging supporting legs or frames. Each such leg or frame consists of a pair of spaced upwardly-converging longitudinal or side bars 1, rigidly secured together and held in spaced relation by cross bars 2. The two legs or frames are pivotally coupled together at their upper ends by the cross shaft or pivot rod 3 passing transversely through alined holes in the upper ends of the bars 1 of one leg and into alined sockets in the upper ends of the bars of the other leg; the upper ends of the bars of one leg being arranged between the upper ends of the bars of the other leg so that in effect the upper ends of the two legs overlap.

When in operative or set up position, the legs of the horse are held against spreading by any suitable means. For instance, I show metal side braces or links 4 pivotally joined to one leg and having notched free ends 4' adapted to detachably receive fixed headed side projections or keepers 5 on the other leg. If so desired vertically arranged series of projections 5 can be provided so that the spread of the legs and consequently the elevation of the pivot shaft 3, can be varied by changing the hooked or notched ends of the braces from one set of keepers 5 to another set. The leg provided with the sets of headed keepers 5 is also near its upper end preferably provided with similar side keepers 5', on which the free ends of the braces 4 can be hooked when the horse is folded or collapsed, as hereinafter set forth.

Also the legs are preferably provided at the inner sides of their bars with freely swingable hooks 6, to coöperate with the seesaw beam, when collapsed, as hereinafter explained.

In the specific embodiment illustrated, the seesaw beam or element comprises two approximately similar beam sections or lengths 7, a center base, coupling or supporting member or section 8, and a center yoke or loop 9, fixed to said coupling member and confined to and rockable on the shaft 3.

The yoke 9 in this instance consists of a strong U-shaped iron plate having elongated vertical legs 9', depending within the upper end of the horse. The lower ends of the plate are formed with transverse alined bearing openings receiving the shaft 3 so that the plate is confined to said shaft and rockable thereon. The yoke traverses the beam member 8 approximately at the center of the length of said member and said member is located approximately midway between the shaft 3 and the top or transverse portion of the yoke. The depending legs 9' of the yoke fit and traverse the edges of the beam member 8 and said member is rigidly secured to the yoke as by fastening devices 10 passed through the legs of the yoke and into member 8 at the edges thereof.

The end portions of the beam member 8 are provided with fixed upright metal loops 11 rising from the member and at their lower ends fitting and rigidly secured to the edges of the member and these two loops are preferably spaced equal distances from the center yoke 9.

The two approximately similar beam lengths or members 7 rest on the top surface of the member 8 and extend longitudinally thereof through the loops 11 and into the yoke 9. Each section 7 is in length approximately equal to one-half the length of the seesaw beam and the end edges of said two sections approximately meet and abut within the yoke 9 and under the comparatively wide flat top or transverse portion thereof. The outer ends of the beam sections 7, are preferably formed to provide seats 12 to be straddled by the children when operating the teeter, and adjacent to said seats 12 the beam sections are preferably provided with rigid transverse loops 13, rising from the beam and at their lower ends fitting and fixed to the edges of the beam. These loops 13, form upright handles to be grasped by the children straddling the seats 12 of the beam, and said loops also perform other functions when the teeter is collapsed as will be more fully pointed out hereinafter.

The transverse width of the flat center member 8 is approximately the same as the transverse width of the flat beam sections 7, and the length of the member 8 is such that substantial lengths of the sections 7 rest on member 8 when the parts are set up in operative position. The sections 7 are assembled by placing their inner ends on the top surface of the member 8 and sliding said sections on member 8 through loops 11 and toward yoke 9 until the inner ends of both sections have entered the yoke the desired distance. Suitable devices or means are provided to removably lock or secure the sections 7 in operative position. For instance, as convenient and effective means for this purpose, I show suitable headed stop pins 14, adapted to removably enter vertical perforations 15 in sections 7. These perforations 15 are so located in the inner end portions of the sections that when the sections are in operative position and the stop pins 14 are inserted therein, said pins will be arranged at the side edges of the loops 11, adjacent to the yoke 9 and hence will act as stops against outward or withdrawing longitudinal movements of sections 7 from yoke 9, and through loops 11.

The stop pins 14 are preferably confined against loss and misplacing by chain lengths 17 secured to the member 8 preferably at an edge thereof.

When the teeter is set up in assembled condition, the seesaw beam thereof is supported by the cross shaft 3 through the medium of the plate ends, which in effect form depending ears rigid with and upholding the beam and rocking therewith as the beam swings or oscillates on the cross shaft 3 as a center, said cross shaft being located in a horizontal plane a distance below the beam member 8. The beam members 7 are held in alinement with each other and down on and parallel with the member 8 by the loops 11 and yoke 9, as will be readily understood by those skilled in the art. The distance between the top surface of the member 8 and the under surface of the top of yoke 9 is usually slightly in excess of the thickness of beam sections 7 to permit ready assembling and disassembling of the parts and also to in a measure increase the elasticity or springing action of the sections 7 under the weight and movement of the children on the seats 12. This springing action of the sections 7, is due to the bearing down of said sections on the end portions of the member 8 and the upward bearing of the inner ends thereof against the yoke 9.

The member 8 forms an elongated support and firm coupling base for the inner end portions of sections 7, and coöperates in providing a seesaw beam of durability and load carrying capacity.

The beam can be disassembled or collapsed into a comparatively small compass by removing the stop pins 14, from the sections 7 and member 8, and then longitudinally withdrawing the sections 7 from member 8 and from the yoke 9 and loops 11 thereof. One section 7 is then reversed, so that its loop 13 depends therefrom, and slipped longitudinally of the top face of member 8 and through both loops 11 and the yoke 9, until its loop 13 abuts one end of member 8 and acts as a stop against further movement of the section in that direction. The ends of this section 7 will then project approximately uniform distances beyond the ends of member 8. This section can then be secured in this position by a stop pin 18, removably inserted in a vertical perforation in the top of yoke 9, and through a hole in the section 7 and into a hole in the center of member 8. This pin 18 can be secured against loss by a chain 17, secured to member 8, as described in connection with pins 14. The other section 7 is slipped longitudinally of the under surface of the member 8 and between the yoke ends 9' and the cross shaft 3 until its handle loop 13 abuts the other end of member 8 from that engaged by the loop 13 of the upper section 7. The cross shaft 3 holds the under section 7 to the bottom face of member 8, so that the sections 7 will be parallel with and held to the member 8 with their ends projecting approximately equal distances beyond the same and into a space in length equal to approximately one-half the full length of the seesaw beam when set up. The under section can be held against sliding longitudinally by one of the pins 14 inserted in the hole 15 in said section hereinbefore mentioned.

The horse can be collapsed by releasing the hooked ends of the braces 4 from the keepers 5, and then swinging the legs (on shaft 3 as an axis) upwardly against the bottom beam section 7 so that the two legs of the horse are in continuation of each other. The braces 4 are then hooked onto the keepers 5', and the legs can be locked in position approximately parallel with the collapsed beam members by engaging the hooks 6 with the adjacent fastening devices of the chains 17. The cross pieces 2 of the horse legs are preferably so arranged and secured, that the bars 1 of said legs can extend up at the outer edges of the collapsed beam members with the cross pieces 2 engaging the bottom face of the under section 7.

The teeter can thus be collapsed into compact form with all parts and members connected together. When thus collapsed the teeter can be easily carried from place to place and from room to room of a house, and can be easily and conveniently stored in the house or elsewhere, and can be very readily packed for shipment and can be conveniently stored in warehouses or elsewhere by the manufacturer, jobber or retailer. The teeter can also be easily and quickly assembled or set up for operation by children and other unskilled persons. To set up the device for operation, it is only necessary to release the hooks 6, and the braces 4 (from keepers 5') and then swing the horse legs down until the braces 4 can be hooked onto keepers 5 that will hold the legs apart at the desired angle. The pins securing the beam sections 7 in collapsed position on member 8 are withdrawn, and said sections are then slipped longitudinally from said member and the keeper and loops. The pin 18 can then be dropped into place again in yoke 9, and the sections 7 can be placed one at a time on the top face of the member 8 and slipped into place through loops 11 and into yoke 9, and secured as hereinbefore described. The pin 18 will act as a stop limiting the inward movements of the sections 7 when being slipped into place.

It is evident that various changes, modifications and departures might be resorted to without avoiding the spirit and scope of my invention, and hence I do not wish to limit myself to the exact disclosures hereof.

What I claim is:—

1. A teeter comprising a seesaw beam embodying a longitudinally elongated center coupling and supporting member and longitudinal sections arranged thereon and removably fastened thereto, in combination with a folding supporting horse therefor constructed and arranged to collapse and fold against and approximately parallel with said beam, a fulcrum for said beam securing the same to said horse, and means including said fulcrum whereby said sections can be removed from normal beam-forming position and packed longitudinally of said member and removably secured parallel therewith and against the top and bottom sides thereof, respectively, to reduce the normal length of the beam approximately by half.

2. A teeter comprising a support having a cross shaft, and a seesaw beam consisting essentially of a center longitudinal plank pivotally confined to said shaft, beam sections normally arranged in operative extended position resting longitudinally on the top surface of said plank, means normally confining said sections to said plank, and removable stop pins for holding said sections against longitudinal movement.

3. A teeter comprising a seesaw beam embodying a longitudinal center supporting and coupling member having upwardly extending loops and a center upwardly extending yoke, and a pair of beam sections arranged on and longitudinally of said member and within said loops and yoke.

4. A teeter comprising a seesaw beam embodying a longitudinal center member provided with beam supporting and fulcruming means, a pair of beam sections arranged longitudinally of and removably coupled to said member in approximate longitudinal alinement, and means embodying section-confining devices and said beam supporting means, whereby said sections can be packed longitudinally of and at the opposite faces of said member to reduce the normal length of the beam approximately by half.

5. A teeter comprising a support, and a seesaw beam having a center member provided with a yoke extending above and below the member, the lower portion thereof forming the supporting connection of the beam with said support, said beam embodying two sections normally arranged longitudinally of said member in approximate longitudinal alinement and entering the upper portion of said yoke, said beam constructed and arranged to be collapsed for packing with one of said sections arranged under the upper portion of the yoke and on the said member, and the other section at the under side of said member and within the lower portion of said yoke.

6. A teeter comprising a supporting horse having a top cross shaft, and a seesaw beam at the center of its length having ears rigid therewith and depending therefrom and coupled to said shaft to provide a space between the center of the beam and the shaft, said beam embodying removable sections normally arranged in approximate longitudinal alinement with each other, and means whereby said beam can be knocked down and packed with said sections arranged side by side to reduce the length of the beam approximately by half with one of said sections in said space.

7. A teeter comprising supporting legs, a cross shaft pivotally joining their upper ends, a seesaw beam mounted on and pivotally coupled to said cross shaft, a link for detachably connecting said legs and normally holding them in downwardly diverging operative position, said legs when released by said link adapted to swing in opposite directions into position against said beam and in approximate longitudinal alinement, and means whereby said link detachably connects said legs when thus folded to the beam and holds them in approximate longitudinal alinement, substantially as described.

8. A teeter comprising a seesaw beam consisting of a longitudinally-arranged center coupling member, separate beam sections arranged longitudinally thereof and removably coupled thereto in operative position in longitudinal alinement, each section having a handle near its outer end, means whereby said sections can be packed longitudinally of said member in knocked down adjustment with said handles engaging the ends of said member and performing the function of stops, and means for securing said sections in operative and in knocked down adjustments.

9. A teeter comprising a seesaw beam having a center longitudinal plank forming a coupling member and provided with a center upwardly extending yoke, removable beam sections normally resting longitudinally on the top surface of said plank in longitudinal alinement with their inner ends removably fitted in said yoke, means removably confining said sections against longitudinal movement with respect to said plank, and means removably confining said sections down to the end portions of said plank.

10. A teeter comprising a seesaw beam composed of relatively-movable plank sections, one of said sections constituting a center supporting member and the other sections being parallel therewith and longitudinally arranged with respect thereto, means normally maintaining said sections in operative extended beam-forming adjustment, said beam constructed and arranged to be reduced in length approximately by half with said sections confined together side by side, in combination with a support for said beam, and means pivotally coupling said center section to said support, said several means being constructed and arranged to receive and removably confine said several sections when packed together side by side, said support constructed and arranged to fold to said beam for packing.

(Signed,)  EDGAR P. ELZEY.

Copies of this patent may be obtained for five cents each, by addressing the "Commissioner of Patents, Washington, D. C."